(12) United States Patent
Choi

(10) Patent No.: US 9,429,112 B2
(45) Date of Patent: *Aug. 30, 2016

(54) ENGINE SYSTEM HAVING TURBO CHARGER

(71) Applicant: Hyundai Motor Company, Seoul (KR)

(72) Inventor: Won Rok Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 161 days.

This patent is subject to a terminal disclaimer.

(21) Appl. No.: 14/303,194

(22) Filed: Jun. 12, 2014

(65) Prior Publication Data

US 2015/0159592 A1  Jun. 11, 2015

(30) Foreign Application Priority Data

Dec. 6, 2013  (KR) .................. 10-2013-0151792

(51) Int. Cl.
| F02B 29/04 | (2006.01) |
| F02B 33/44 | (2006.01) |
| F02B 33/00 | (2006.01) |
| F02F 1/10 | (2006.01) |
| F02M 25/07 | (2006.01) |

(52) U.S. Cl.
CPC ...... *F02M 25/0726* (2013.01); *F02B 29/0437* (2013.01); *F02B 29/0462* (2013.01); *F02B 29/0475* (2013.01); *Y02T 10/146* (2013.01)

(58) Field of Classification Search
CPC .................. F02M 25/0726; F02M 25/0706; F02B 29/0437; F02B 29/0475; F02B 37/00; F28D 7/16; F28F 21/062; F01P 2060/02; Y02T 10/146

USPC ................. 60/605.1, 599; 123/563, 41.72
See application file for complete search history.

(56) References Cited

U.S. PATENT DOCUMENTS

| 4,269,158 A | * | 5/1981 | Berti .................. F02B 29/0462 123/563 |
| 5,261,356 A | * | 11/1993 | Takahashi et al. ............ 60/599 |
| 6,192,849 B1 | * | 2/2001 | Powell ..................... 123/184.34 |
| 6,474,284 B1 | * | 11/2002 | Baumann et al. ....... 123/184.42 |
| 7,124,727 B2 | * | 10/2006 | Kogawa et al. ......... 123/184.21 |

(Continued)

FOREIGN PATENT DOCUMENTS

| DE | 102004032777 A1 * | 7/2005 | ............. F02B 29/04 |
| DE | 102008029455 A1 * | 12/2009 | ............. F02B 29/04 |

(Continued)

*Primary Examiner* — Thai Ba Trieu

(74) *Attorney, Agent, or Firm* — Morgan, Lewis & Bockius LLP

(57) ABSTRACT

An engine system having a turbocharger may include an engine block, a turbocharger, an intake line and an intercooler. The engine block may include a cylinder head disposed on an upper side of the engine block, an intake manifold disposed at one side of the cylinder head, and an exhaust manifold disposed at the other side of the cylinder head. The turbocharger may compress intake air by exhaust gas exhausted from the exhaust manifold, and the intake line may be formed from the turbocharger to the intake manifold to transfer the intake air compressed by the turbocharger to the intake manifold. The intercooler may be disposed on the intake line adjacent to the intake manifold to cool the compressed intake air. The compressed intake air discharged from the turbocharger may pass a side of the cylinder head and an engine coolant flowing the cylinder head may cool the compressed intake air.

4 Claims, 3 Drawing Sheets

(56) References Cited

U.S. PATENT DOCUMENTS

| | | | |
|---|---|---|---|
| 8,984,878 B2* | 3/2015 | Grosch et al. | 60/599 |
| 2007/0251232 A1* | 11/2007 | de Kok | F02B 29/0462 60/599 |
| 2015/0059712 A1* | 3/2015 | Bakindi | F02B 29/0462 123/542 |
| 2015/0159542 A1* | 6/2015 | Choi | F02B 29/0462 |
| 2015/0159593 A1* | 6/2015 | Choi | F02M 25/0726 |
| 2015/0167595 A1* | 6/2015 | Choi | F02M 25/0706 |

FOREIGN PATENT DOCUMENTS

| | | | | |
|---|---|---|---|---|
| DE | 102011013029 A1 | * | 9/2011 | ............. F02M 25/07 |
| GB | 2416001 A | * | 1/2006 | .......... F02B 29/0406 |
| JP | 3-5931 U | | 1/1991 | |
| JP | 4-84722 U | | 7/1992 | |
| JP | 10-509225 A | | 9/1998 | |
| JP | 2005-2983 A | | 1/2005 | |
| JP | 2011-190744 A | | 9/2011 | |
| JP | 2013-104314 A | | 5/2013 | |
| KR | 10-2011-0064054 A | | 6/2011 | |

* cited by examiner

ENGINE SYSTEM HAVING TURBO CHARGER

CROSS-REFERENCE TO RELATED APPLICATION

The present application claims priority of Korean Patent Application Number 10-2013-0151792 filed on Dec. 6, 2013, the entire contents of which application are incorporated herein for all purposes by this reference.

BACKGROUND OF INVENTION

1. Field of Invention

The present invention relates to an engine system having a turbocharger which resolves responsiveness delay that is generated by a dead volume that is formed by an intake hose of an engine and improves performance of an intercooler.

2. Description of Related Art

In general, it is known that a diesel engine consumes less fuel and has excellent efficiency in comparison with a gasoline engine. Typically, the diesel engine exhibits efficiency of about 40%, which results from a high compression ratio of the diesel engine.

The recent engine additionally has a turbocharger, an intercooler, and the like in order to obtain higher output. The engine to which the turbocharger is applied sucks and compresses exhaust gas or external air using a compressor of the turbocharger, and supplies supercharged air (high-temperature compressed air), which is generated by the turbocharger, to an engine side.

However, the air, which is rapidly compressed, absorbs heat from the turbocharger and heat that is generated during a compression process, such that density of the air is decreased, and as a result, charging efficiency in a combustion chamber of the engine deteriorates.

Therefore, high density may be obtained by cooling the supercharged air using the intercooler, and as a result, a larger amount of air may be sucked in the combustion chamber of the engine, thereby obtaining high output.

Meanwhile, a water-cooled intercooler has been being applied to engine and the capacity thereof has been increased, and researches for improving responsiveness of turbocharger has been being under taken.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an engine system having a turbocharger having advantages of stably cooling high temperature compressed air that is compressed by a turbocharger, reducing the capacity of a water-cooled intercooler, and simultaneously improving responsiveness of a turbocharger.

An engine system having a turbocharger according to various aspects of the present invention may include: an engine block including a cylinder head disposed on an upper side of the engine block, an intake manifold disposed at one side of the cylinder head, and an exhaust manifold disposed at the other side of the cylinder head; a turbocharger that compresses intake air by exhaust gas exhausted from the exhaust manifold; an intake line formed from the turbocharger to the intake manifold to transfer the intake air compressed by the turbocharger to the intake manifold; and an intercooler disposed on the intake line adjacent to the intake manifold to cool the compressed intake air, wherein the compressed intake air discharged from the turbocharger passes a side of the cylinder head and an engine coolant flowing the cylinder head cools the compressed intake air.

The intercooler may use a low temperature coolant that circulates through a separate coolant line different from that of the engine coolant cooling the cylinder head to cool the intake air.

An intake passage through which the intake air flows may be formed in the cylinder head and a coolant passage through which the engine coolant flows may be formed around the intake passage. The intercooler and the intake manifold may be combined with each other.

A cross-section of the intake passage may have a substantially circular shape and a cross-section of the coolant passage may have a cylindrical shape to surround the substantially circular shape.

The intake line may be formed from a turbine housing of the turbocharger to an inlet of the intake passage, and a connection flange may be formed to be engaged with the inlet of the intake passage on the intake line.

In accordance with the present invention for realizing the object, high temperature compressed air that is compressed by a compressor of a turbocharger passes a cylinder head to be firstly cooled by engine coolant and passes a water-cooled intercooler to be secondly cooled such that overall cooling efficiency of compressed air is improved.

Also, an intake line does not bypass an engine block, the intake line penetrates an engine block, and therefore the length of the intake pipe can be reduced. Further, responsiveness of an engine can be improved by reducing the length of the intake line.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
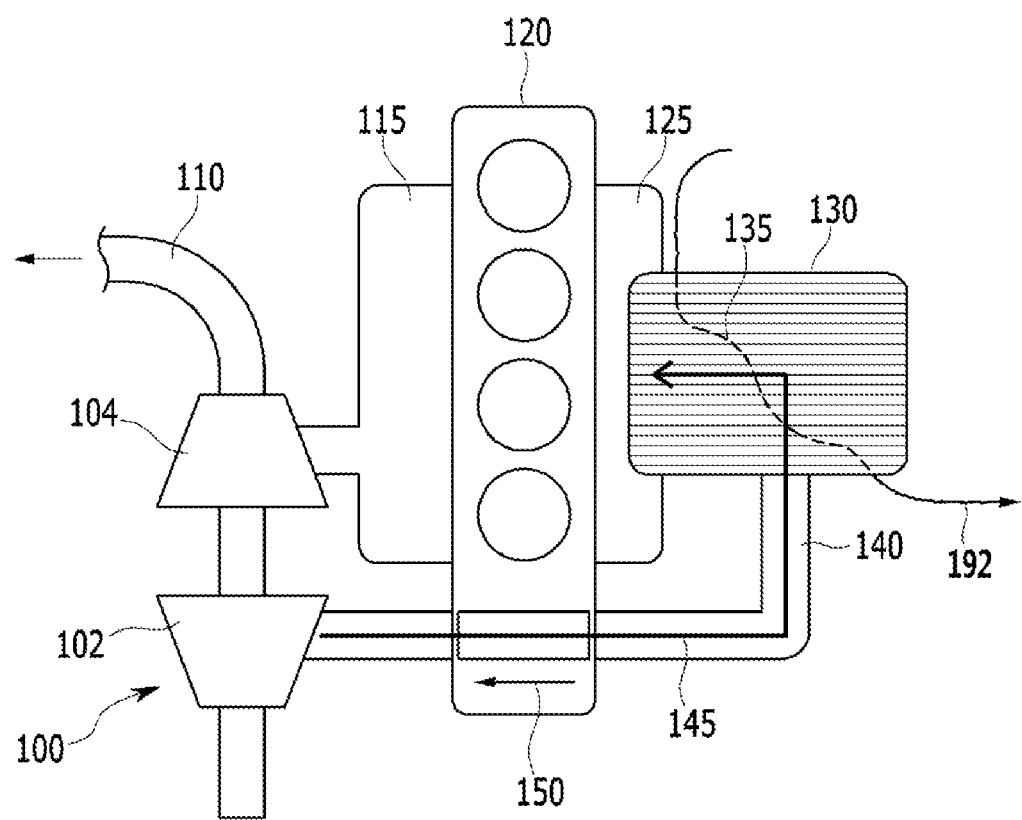
FIG. 1 is a schematic diagram of an exemplary engine system having a turbocharger according to the present invention.

FIG. 1 is a schematic diagram of an engine system having a turbocharger according to various embodiments of the present invention. Referring to FIG. 1, an engine system having a turbocharger includes a turbocharger 100, an intake line 140, an intercooler 130, an intake manifold 125, an engine block 120, an exhaust manifold 115, and an exhaust line 110.

And, the turbocharger 100 includes a turbine 104 that is rotated by exhaust gas of exhaust line and a compressor 102 that is connected to the turbine 104 through a rotation shaft to compress intake air of the intake line 140.

The intake line 140 is formed from the compressor 102 of the turbocharger 100 to the water-cooled intercooler 130 and compressed air 145 flowing through the intake line 140 penetrates one side of the engine block 120.

The compressed air 145 passing the engine block 120 is firstly cooled by the engine coolant 150 for cooling the engine block 120, and is secondly cooled by separate low temperature coolant 135 in the intercooler 130.

In various embodiments of the present invention, the engine coolant 150 circulates a first coolant circulating line, and the low temperature coolant 135 circulates a second coolant circulating line 192. As described above, the compressed air 145 that is compressed by the compressor 102 of the turbocharger 100 is firstly cooled by engine coolant of the engine block 120 and is secondly cooled by low temperature coolant 135 of a second coolant line 192 passing the intercooler 130 such that intake air is stably cooled and combustion efficiency is improved.

Further, the length of the intake line 140 that is from the compressor 102 of the turbocharger 100 to the intercooler 130 is reduced, capacity/load of the intercooler 130 can be reduced, and the responsiveness can be improved, because the turbocharger 100 is closely disposed near the engine block 120.

Figure 2:
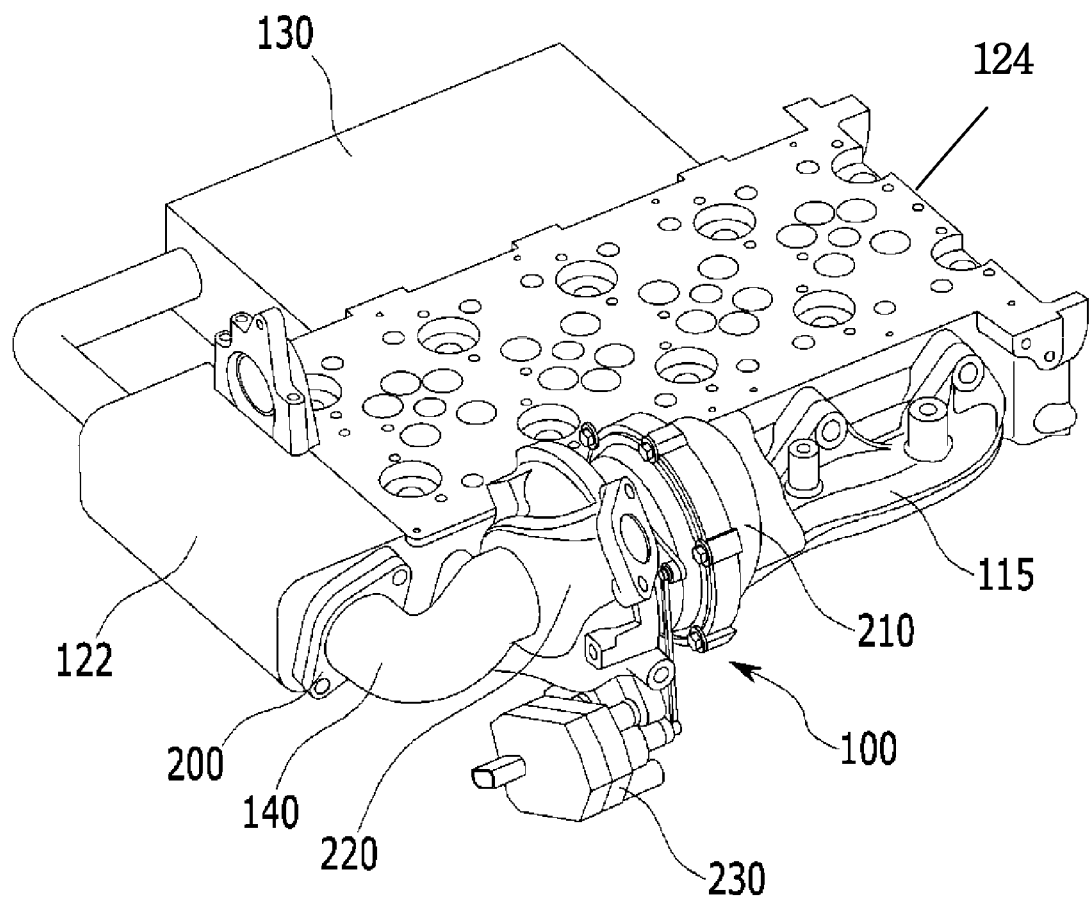
FIG. 2 is a partial perspective view of an exemplary engine system having a turbocharger according to the present invention.

FIG. 2 is a partial perspective view of an engine system having a turbocharger according to various embodiments of the present invention. Referring to FIG. 2, the engine block 120 includes a cylinder head 124 that is disposed at an upper side of a cylinder block or the engine block, the exhaust manifold 115 is formed at one side of the cylinder head 124, the intake manifold 125 is formed at the other side thereof, and an intake line penetration portion 122 is formed at one side end of the cylinder head.

A turbine housing 210 of the turbocharger 100 is disposed near the exhaust manifold 115, and a turbine 104 is disposed inside the turbine housing 210. The compressor housing 220 is disposed near the turbine housing 210, and a compressor 102 is disposed inside the compressor housing 220.

A bearing housing is disposed between the turbine housing 210 and the compressor housing 220, and an actuator 230 is disposed to control the flowing of the exhaust gas that is supplied to the turbine 104 on the turbocharger 100.

A connection flange 200 is disposed at an inlet side of the intake passage (300 of FIG. 3) that is formed at one inner side of the intake line penetration portion 122, and the intake line 140 connects the connection flange 200 with an outlet side of the compressor housing 220.

The compressed air that passed the intake line penetration portion 122 through the intake line 140 is supplied to the intake manifold 125 through the intercooler 130.

Figure 3:
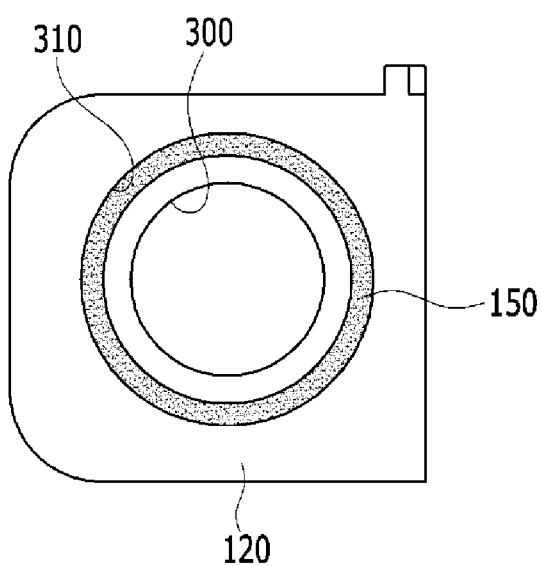
FIG. 3 is a partial cross-sectional view of an exemplary engine system having a turbocharger according to the present invention.

FIG. 3 is a partial cross-sectional view of an engine system having a turbocharger according to various embodiments of the present invention. Referring to FIG. 3, the intake passage 300 is formed inside the intake line penetrating portion 122 corresponding to the intake line 140. In some embodiments, the intake passage 300 has a circular or substantially circular section, and the coolant passage 310 is formed around the intake passage 300.

As shown in the drawings, the coolant passage 310 can have a cylindrical pipe shape that is formed around the intake passage 300 to have a predetermined thickness. Accordingly, the compressed air 145 passing the intake passage 300 is firstly cooled by low temperature coolant 135 of the coolant passage 310.

For convenience in explanation and accurate definition in the appended claims, the terms "upper" or "lower", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine system having a turbocharger, comprising:
an engine block including:
    a cylinder head disposed on an upper side of the engine block,
    an intake manifold disposed at a first side of the cylinder head, and
    an exhaust manifold disposed at a second side of the cylinder head;
a turbocharger compressing intake air by using exhaust gas exhausted from the exhaust manifold;
an intake line formed from the turbocharger to the intake manifold to supply compressed intake air compressed by the turbocharger to the intake manifold; and
an intercooler disposed on the intake line adjacent to the intake manifold to cool the compressed intake air,
wherein the compressed intake air discharged from the turbocharger passes a portion of the cylinder head and an engine coolant flowing the cylinder head cools the compressed intake air,
wherein an intake passage through which the compressed intake air flows is formed in the cylinder head and a coolant passage through which the engine coolant flows is formed around the intake passage,
wherein the intake passage formed in the cylinder head and the intercooler are separately formed each other, and
wherein the intercooler and the intake manifold are combined with each other.

2. The engine system having a turbocharger of claim 1, wherein the intercooler uses a low temperature coolant circulating through a separate coolant line different from that of the engine coolant cooling the cylinder head to cool the intake air.

3. The engine system having a turbocharger of claim 1, wherein a cross-section of the intake passage has a circular shape and a cross-section of the coolant passage has a circular shape surrounding the circular shape of the intake passage.

4. The engine system having a turbocharger of claim 1, wherein the intake line is formed from a compressor housing of the turbocharger to an inlet of the intake passage, and a connection flange is formed to be engaged with the inlet of the intake passage on the intake line.

* * * * *